United States Patent
Peignier et al.

(10) Patent No.: US 12,013,867 B2
(45) Date of Patent: Jun. 18, 2024

(54) DISTRIBUTED DATA PROCESSING USING EMBEDDED HERMETIC AND DETERMINISTIC LANGUAGE

(71) Applicant: Treasure Data, Inc., Mountain View, CA (US)

(72) Inventors: Timothée Peignier, Vancouver (CA); Edward Steel, Vancouver (CA)

(73) Assignee: Treasure Data, Inc., Mountain View, CA (US)

( * ) Notice: Subject to any disclaimer, the term of this patent is extended or adjusted under 35 U.S.C. 154(b) by 128 days.

(21) Appl. No.: 17/815,234

(22) Filed: Jul. 27, 2022

(65) Prior Publication Data

US 2024/0037114 A1 Feb. 1, 2024

(51) Int. Cl.
G06F 16/20 (2019.01)
G06F 8/30 (2018.01)
G06F 8/70 (2018.01)
G06F 16/25 (2019.01)

(52) U.S. Cl.
CPC .............. *G06F 16/252* (2019.01); *G06F 8/31* (2013.01); *G06F 8/70* (2013.01)

(58) Field of Classification Search
CPC .................................................. G06F 16/252
See application file for complete search history.

(56) References Cited

U.S. PATENT DOCUMENTS 11,403,298 B1 * 8/2022 Brossard ........... G06F 16/24564

OTHER PUBLICATIONS

Starlark Language Specification, May 11, 2020 [retrieved on Feb. 15, 2024]. Retrieved from the Internet:< https://web.archive.org/web/20200511205044/https://github.com/bazelbuild/starlark/blob/master/spec.md >. (Year: 2020).*

* cited by examiner

Primary Examiner — Kristopher Andersen
(74) Attorney, Agent, or Firm — Baker Botts L.L.P.

(57) ABSTRACT

In one embodiment, a computer system comprises one or more central processing units (CPUs) that are communicatively coupled to a system clock, one or more network interfaces, and one or more database interfaces; digital electronic main memory that is communicatively coupled to the one or more CPUs and storing one or more sequences of stored program instructions which, when executed using the one or more CPUs, cause the one or more CPUs to execute a plurality of different consumer services of a SaaS-based data analytics platform, each of the consumer services hosting an instance of a sandboxed runtime for a hermetic and deterministic programming language; user function storage that is communicatively coupled to one of the database interfaces and storing a plurality of different user functions, each of the user functions having been programmed using the programming language, each of the user functions being stored in association with a reference to a destination table of a destination database; each of the consumer services being programmed to initiate a data ingestion process; load a copy of a user function from the user function storage to the sandboxed runtime that is associated with the particular consumer service; using the sandboxed runtime local to the particular consumer service, execute the user function over records directed to the destination table identified in the reference; filter the records or write new records resulting from the function to the destination table.

11 Claims, 5 Drawing Sheets

DISTRIBUTED DATA PROCESSING USING EMBEDDED HERMETIC AND DETERMINISTIC LANGUAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Treasure Data, Inc.

TECHNICAL FIELD

One technical field of the present disclosure is relational database systems, including automated transformations of database records.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital relational databases now are widely used to store, manage, and control the flow of information in business enterprises, with integration into a variety of practical applications. For example, a customer data platform (CDP) is a special-purpose combination of database storage technology and server application software that facilitate storing millions of data signals representing interactions of consumers or end users with merchant websites, social media, digital advertising, and other resources, conducting analysis of the signals, forming audience segments, and other tasks. Supplier of CDPs typically grant access, to enterprise customers, to an instance of a CDP that operates with multi-tenant, siloed data that is subject to security controls.

Customers of CDPs create and store business logic that defines transformations of datasets and other operations on data stored in the CDP. Customers would like to have their business logic applied to their data across all applications of the CDP in a uniform way. However, when business logic that was created for one application is applied to a second, different application, unexpected results can occur. Further, the business logic created for one application can be treated as non-trusted from the perspective of a second application.

One approach to this issue is centralized execution of the data processing logic. However, this approach creates a single point of failure and can lead to resource contention if multiple different applications need to execute the same logic at the same time.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

1. General Overview

Centrally managed business logic is distributed to a plurality of different applications of a federated system using an hermetic and deterministic language. The hermetic and deterministic language provides a sandbox to safely execute customer business logic by preventing unsafe access and/or excessive use of resources. The language offers extensive options for data computation, and allows virtual routing of logic to different applications. Customers can execute their business logic without constraints, but cannot inadvertently or maliciously escape the sandbox. Furthermore, individual applications can change parts of the business logic locally. The creator of the business logic has a single view which elides the many components that are involved.

Embodiments can be applied in the context of data ingestion processes in which increased data processing efficiency is achieved by filtering or transforming records of input datasets before storing records in a destination table of a destination database. Example functions that can be performed during data ingestion include masking, anonymization, removal of sensitive financial or personal information, replacing values representing personal income with a band or range, or excluding data from a sensitive country. Embodiments also facilitate repeated execution of the same logic uniformly using more than one application, process, or consumer service. Safe execution without adverse impact on the platform also is important since user functions could be customer-defined outside the control of an administrator of the platform.

Goals of hermetic and deterministic execution can be achieved by implementing user functions in a programming language having a runtime with those characteristics. In one embodiment, a JAVA implementation of the STARLARK environment is used, but others are possible. In this environment, a user function can define substantive data processing operations but cannot access disk storage or execute network calls; furthermore, the runtime cannot be modified to add these functions. In some embodiments, the runtime is extended to provide REGEX support, and is configured with a maximum number of run iterations to enable shutting down the runtime when an ingestion operation involves so many records that system performance could suffer.

In various embodiments, the disclosure encompasses the subject matter of the following numbered clauses:

1. A computer system comprising: one or more central processing units (CPUs) that are communicatively coupled to a system clock, one or more network interfaces, and one or more database interfaces; digital electronic main memory that is communicatively coupled to the one or more CPUs and storing one or more sequences of stored program instructions which, when executed using the one or more CPUs, cause the one or more CPUs to execute a plurality of different consumer services of a SaaS-based data analytics platform, each of the consumer services hosting an instance of a sandboxed runtime for a hermetic and deterministic programming language; user function storage that is communicatively coupled to one of the database interfaces and storing a plurality of different user functions, each of the user functions having been programmed using the programming language, each of the user functions being stored in association with a reference to a destination table of a destination database; each of the consumer services being programmed to initiate a data ingestion process; load a copy of a user function from the user function storage to the sandboxed runtime that is associated with the particular consumer service; using the sandboxed runtime local to the particular consumer service, execute the user function over records directed to the destination table identified in the reference; filter the records or write new records resulting from the function to the destination table.

2. The computer system of clause 1, the SaaS-based data analytics platform comprising a customer data platform (CDP).

3. The computer system of clause 1, the programming language comprising STARLARK.

4. The computer system of clause 1, each of the consumer services being programmed to delete the user function from the particular consumer service or its sandboxed runtime after completing the data ingestion process.

5. The computer system of clause 1, each of the consumer services being programmed to: receive an identifier of a source dataset for ingestion; read successive records of the source dataset until all records have been read; for each record of the successive records that is read, determine whether a user function is present in the user function storage and has a reference to the destination table, and only when the user function is present and has the reference to the destination table, execute the user function over the each record.

6. The computer system of clause 5, each of the consumer services being programmed to write a new record resulting from executing the user function only when the new record is valid.

7. The computer system of clause 1, each of the consumer services being programmed to: asynchronously, with respect to the execution of the particular consumer service, using a plurality of other consumer services among the plurality of different consumer services executing in a SaaS-based data analytics platform, initiate a plurality of other data ingestion processes for a plurality of datasets; as part of each data ingestion process among the plurality of other data ingestion processes, load a second copy of the user function using a second sandboxed runtime that is associated with each other consumer service; using a second sandboxed runtime that is local to each other consumer service, execute, over records of the datasets, the second copy of the user function directed to the destination table identified in the reference and filter the records or write new records resulting from the function to the destination table.

8. A computer-implemented method comprising: receiving a digitally defined user function that has been coded using a hermetic and deterministic human-readable programming language; storing the user function in a centralized database of user functions, in a table of user functions with a reference to a destination table; at a particular consumer service among a plurality of different consumer services executing in a SaaS-based data analytics platform, initiating a data ingestion process; loading a copy of the user function using a sandboxed runtime that is associated with the particular consumer service; using the sandboxed runtime local to the particular consumer service, executing the user function over records directed to the destination table identified in the reference and filtering the records or writing new records resulting from the function to the destination table.

9. The method of clause 8, the SaaS-based data analytics platform comprising a customer data platform (CDP).

10. The method of clause 8, the programming language comprising STARLARK.

11. The method of clause 8, further comprising deleting the user function from the particular consumer service or its sandboxed runtime after completing the data ingestion process.

12. The method of clause 8, the particular consumer service being programmed to: receive an identifier of a source dataset for ingestion; read successive records of the source dataset until all records have been read; for each record of the successive records that is read, determine whether a user function is present in the centralized database of user functions and has a reference to the destination table, and only when the user function is present and has the reference to the destination table, execute the user function over the each record.

13. The method of clause 11, each of the consumer services being programmed to write a new record resulting from executing the user function only when the new record is valid.

14. The method of clause 8, further comprising, after completing the data ingestion process, deleting the user function from the particular consumer service or its sandboxed runtime.

15. The method of clause 8, further comprising: asynchronously, with respect to the execution of the particular consumer service, using a plurality of other consumer services among the plurality of different consumer services executing in a SaaS-based data analytics platform, initiating a plurality of other data ingestion processes for a plurality of datasets; as part of each data ingestion process among the plurality of other data ingestion processes, loading a second copy of the user function using a second sandboxed runtime that is associated with each other consumer service; using a second sandboxed runtime that is local to each other consumer service, executing, over records of the datasets, the second copy of the user function directed to the destination table identified in the reference and filtering the records or writing new records resulting from the function to the destination table.

2. Structural & Functional Overview

Figure 1:
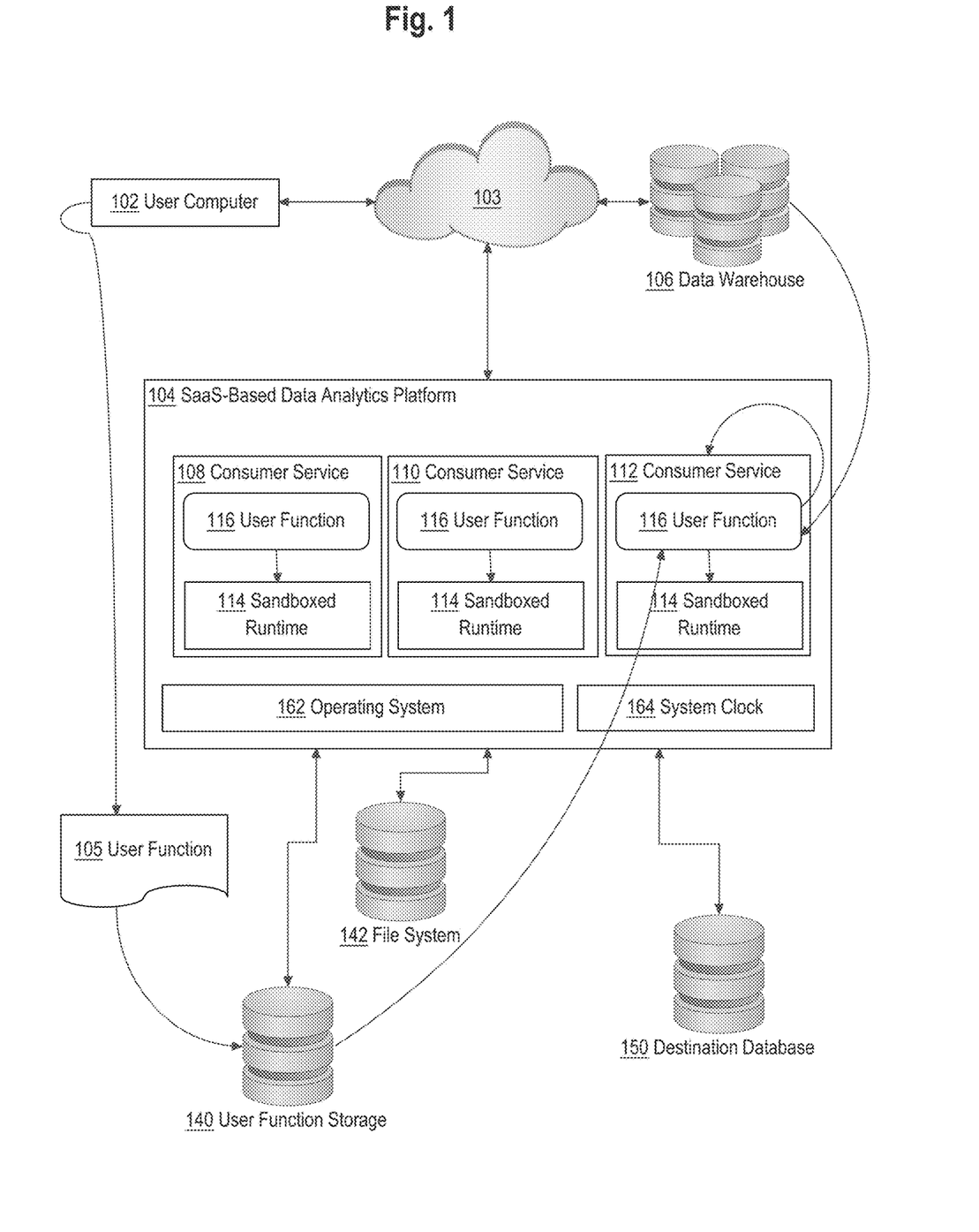
FIG. 1 illustrates a distributed computer system showing the context of use and principal functional elements with which one embodiment could be implemented.

FIG. 1 illustrates a distributed computer system showing the context of use and principal functional elements with which one embodiment could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of how to write once, centrally manage, yet deploy business logic to data across all of a plurality of applications of a SaaS-based application server, such as a CDP, in a uniform way. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a user computer 102 is coupled directly or indirectly via a data communication network 103 to a data warehouse 106 and a SaaS-based data analytics platform 104, which is coupled to user function storage 140 and a destination database 150. For purposes of illustrating a clear example, one user computer 102 is shown, but in practical embodiments there may be any number, up to thousands or millions, depending on the processing power of platform 104, with which the user computer has a client-server relationship. User computer 102 can comprise a laptop computer, desktop computer, workstation, tablet computer, or mobile computing device and typically hosts an operating system and one or more application programs or apps, including an internet browser.

The SaaS-based data analytics platform 104 comprises a federated set of computer program applications, sets of instructions, functions, methods, or other software elements that interoperate to provide data analytics functions to user computer 102 via an HTTP server that can generate dynamic web pages for consumption using a browser at the user computer. Broadly, the platform 104 is programmed to implement data ingestion functions, data storage functions, data analysis, and data display. The platform 104 can implement any of multiple different substantive functions or applications. In one embodiment, platform 104 comprises a customer data platform (CDP) such as the TREASURE DATA platform of Treasure Data, Inc. and Treasure Data K.K. Other embodiments could implement medical data analysis, financial data analysis, business data analysis, education data analysis, or other applications.

Network 103 comprises any combination of one or more local area networks (LANs), wide area networks (WANs), campus networks, or internetworks and can include elements of the public internet. Data warehouse 106 comprises one or more directly attached or networked storage devices, storage clusters, or cloud-based storage systems. Data warehouse 106 can be implemented using systems such as TREASURE DATA CLOUD DATA WAREHOUSE, commercially available from Treasure Data, Inc. and Treasure Data K.K. User function storage 140 and destination database 150 can be implemented using tables in the data warehouse 106, or using independent storage devices and/or database systems.

In an embodiment, user computer 102 can be operated to create and store one or more user functions 105 in the user function storage 140, as further described in other sections herein. The one or more user functions 105 can be stored in text form in a folder, bucket, or other filesystem construct of a file server. For example, AMAZON S3 can be used for large-capacity file storage. Functions typically are marked for read-only access so that the process of FIG. 2 cannot overwrite functions but only read them. Cache storage can be implemented at the filesystem or at the platform 104 to reduce network roundtrips and to read a function from networked persistent storage only when it is accessed for the first time during a job.

The platform 104 comprises, among other elements, a plurality of different consumer services 108, 110, 112, each having a sandboxed runtime 114 that is capable of reading, using, and/or hosting a local copy of a user function 116. Each of the consumer services 108, 110, 112 can comprise any program, set of programs, service, microservice, method, function, object or thread that is capable of receiving a dataset and creating, reading, updating, or deleting records of the dataset in conjunction with stored program functional logic to execute a substantive data processing function. Examples of consumer services include data transformation services, data analytics services, and data presentation services.

The platform 104 comprises, in one embodiment, an operating system 162 that implements services and functions to control access to main memory, I/O devices, a network stack to interface to network 103, and other services. The platform 104 can comprise a system clock 164 that provides a master point of reference for timing of presentation of executable instructions to a CPU of the CDP, memory accesses, I/O accesses, and other functions. Other hardware elements are not shown for clarity but can include those shown in FIG. 5. The platform 104 may be coupled to or integrated with a file system 142 that provides flat file storage of system programs, copies of pages swapped out from main memory, configuration files, bootstrap loader files, and other system support files. Platform 104 can be implemented using one or more physical computers or virtual machines, with network attached storage or virtual storage, in any of a computing cluster, private data center, public cloud data center, or other virtual computing facility. Examples of public cloud data centers that could be used for virtual machine implementations of platform 104 include AMAZON AWS and related services, MICROSOFT AZURE, GOOGLE CLOUD, etc.

In an embodiment, input from a user computer 102 can specify logical operations, expressed in pseudocode, to process events in a stream of result data from other operations or in a batch, and organized in a form of a script file denoted as the user function 105. The logical operations can be expressed in program code and/or a database query language, such as Structured Query Language (SQL). In an embodiment, the platform provides a single entry point that can receive either batch-based or stream-based transformations using a sandboxed language. Functions are written once, but can be executed repeatedly by different consumers or applications in a federated, multi-tenant CDP or other applied database system.

In an embodiment, the user function 105 is coded using the STARLARK language. STARLARK is an open-source system for which program code is available, at the time of this writing, in the path, folder, or directory /bazelbuild/ starlark of the GITHUB service at the domain github.com and accessible via the HTTP protocol from a browser. A JAVA runtime is available, at the time of this writing, in the path, folder, or directory /bazelbuild/bazel/tree/master/src/ maj/java/net/starlark/java of the GITHUB service at the domain github.com and accessible via the HTTP protocol from a browser. In an embodiment, each sandboxed runtime 114 of platform 104 is a copy of the STARLARK runtime module and is capable of executing a copy of the user function 105, which is locally stored and used in the form of users functions 116. Thus, while user function 105 can be created once and centrally stored via user function storage 140, any of the consumer services 108, 110, 112 can, on demand, load a copy of user function 105 from user function storage 140 into memory associated with that consumer service, thus creating and storing user function 116, and locally execute the user function under the control of sandboxed runtime 114. When a user function 116 completes execution, it returns any result and/or an exception or error code to the consumer service that hosts it, e.g., consumer service 112.

Thus, the term "sandboxed" in FIG. 1 can refer, in one embodiment or example, to the attributes of an executable program that is capable of reading or loading, and interpreting or executing, other programs, while enforcing a set of access controls on the code that is interpreted and executed. One set of access controls could be that customer logic in a user function 116 cannot access the file system 142, data warehouse 106 or destination database 150 or other file storage to which the CDP 140 is connected, cannot access network 103, and cannot access the system clock 164 of the CDP, so the untrusted code is safe to execute.

As an example, the STARLARK runtime offers the attributes of deterministic execution and hermetic execution. With deterministic execution, executing the same code twice always yields the same results. With hermetic execution, customer logic cannot access the file system, network, or system clock, and therefore untrusted code is safe to execute. For example, customer logic that attempts to implement recursion, appending to an external list, or loading external scripts will fail, as the STARLARK runtime does not permit these operations. In some embodiments, functions are limited to a specified maximum number of steps, to prevent the use of excess resources when jobs are running. For example, in various embodiments, 50 to 500 steps can be used as limits.

Figure 4:
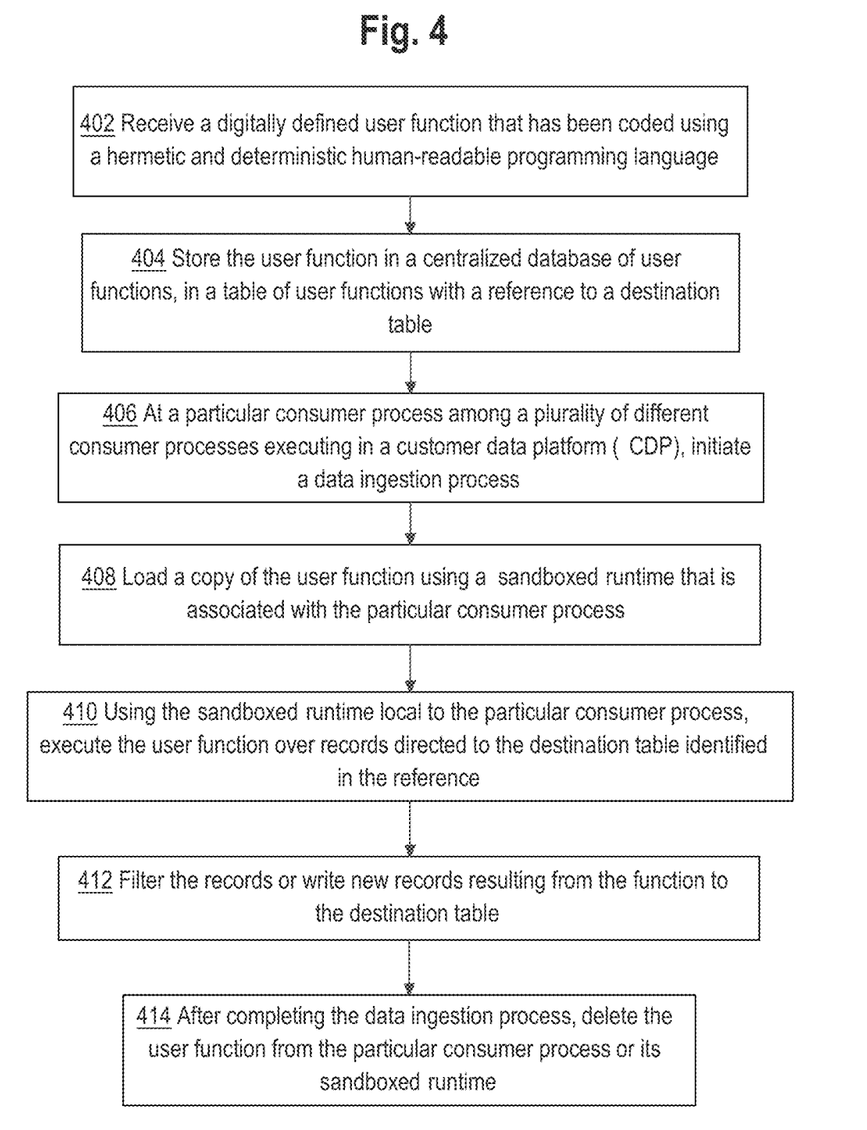
FIG. 4 illustrates a process flow or algorithm that can be programmed to centrally manage user functions and execute the user functions at different consumer processes of the CDP using hermetic and deterministic approaches.

FIG. 4 illustrates a process flow or algorithm that can be programmed to centrally manage user functions and execute the user functions at different consumer processes of the CDP using hermetic and deterministic approaches. At block 402, the process of FIG. 4 is programmed to receive a digitally defined user function that has been coded using a hermetic and deterministic human-readable programming language. The user function can be prepared using a text editor, code editor, source code development environment, or other programming tool, using any of several programming languages, including but not limited to STARLARK, as further described in other sections herein. After the user function has been written and digitally stored in a digital storage device, block 402 can execute to automatically read or retrieve a copy of the user function from a storage location.

At block 404, the process of FIG. 4 is programmed to store the user function in a centralized database of user functions, in a table of user functions with a reference to a destination table. For example, the user function 105 (FIG. 1) can be stored in user function storage 140, which can be formatted according to a table schema that includes a table with rows identifying user functions and one or more column attributes that identify one or more destination tables to which each user function of a row applies.

At block 406, the process of FIG. 4 is programmed to initiate, at a particular consumer process among a plurality of different consumer processes executing in a customer data platform (CDP), a data ingestion process. For example, block 406 can comprise a particular consumer process of the CDP, among a plurality of different consumer processes that are then currently executing in the CDP, programmatically initiating a data ingestion process. Block 406 can execute multiple times asynchronously with respect to multiple different consumer processes of the CDP. That is, the CDP can be programmed as a multi-threaded process in which a plurality of different applications, functions, methods, or other executable units are individually executing at once, on different execution paths. Any such application, function, method, or unit can comprise a consumer process that independently initiates a data ingestion process to obtain or receive data useful for a larger task for which the application, function, method, or unit is programmed.

In an embodiment, each such application, function, method, or unit includes, or can load and run, a copy or instance of a sandboxed runtime that constrains the operation of the user function or other functions. At block 408, the process of FIG. 4 is programmed to load a copy of the user function using the sandboxed runtime that is associated with the particular consumer process.

At block 410, the process of FIG. 4 is programmed to execute, using the sandboxed runtime local to the particular consumer process, the user function over records directed to the destination table identified in the reference. Such localized, sandboxed execution of the user function can, in various embodiments of the user function, result in filtering records and/or creating new records for the destination table that is identified in user function storage for the user function. Thus, block 412 represents multiple different cases in which the process of FIG. 4 is programmed to filter the records or write new records resulting from the function to the destination table, depending on the substantive content of the function.

At block 414, the process of FIG. 4 is programmed to delete the user function from the particular consumer process or its sandboxed runtime after completing the data ingestion process. Block 414 can represent reclaiming memory for a copy of the user function that was received and executed local to a particular consumer process. The operation of block 414 does not affect other centralized storage of the user function, such as user function storage 140. Consequently, at other times after block 414, any consumer process of the CDP can load the user function again and execute it locally using an instance of the sandboxed runtime that the consumer process manages.

Figure 2:
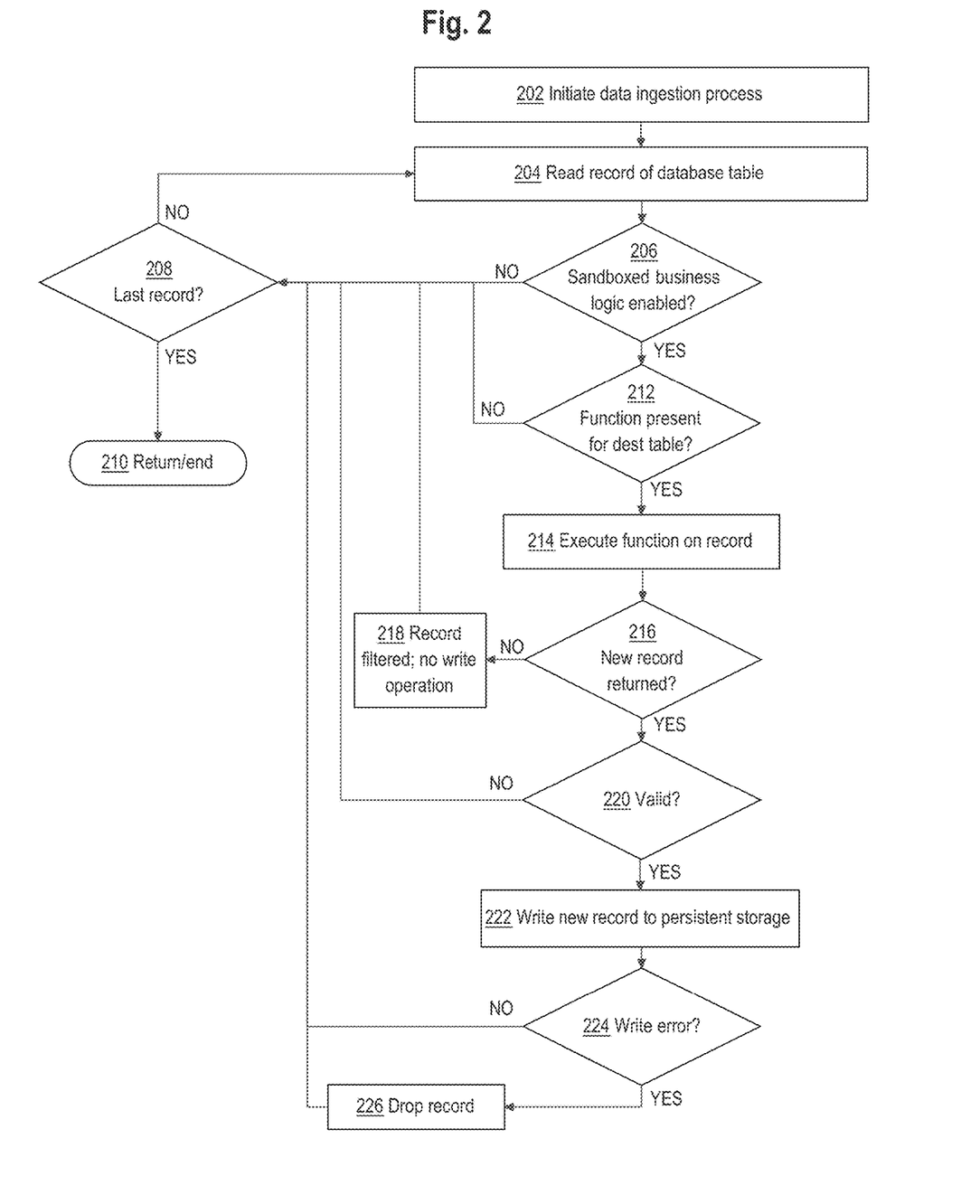
FIG. 2 illustrates an example process or algorithm that can be programmed to implement one embodiment of executing a user function locally in a consumer service of a customer data platform.

FIG. 2 illustrates an example process or algorithm that can be programmed to implement one embodiment of executing a user function locally in a consumer service of a customer data platform. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

At block 202, the process of FIG. 2 initiates a data ingestion process. For example, block 202 may specify that the process of FIG. 2 generally begins when an end user, system, or script initiates a data ingestion process using a native data ingestion function of a customer data platform. The CDP of TREASURE DATA, for example, implements a Data Ingestion API that a program can call to initiate intake of external data into the databases and table schemas of the CDP. Such a call typically specifies at least a source dataset to be ingested and a destination table.

During data ingestion, at block 204, the process of FIG. 2 is programmed to read a record of a database table, typically a source table from which data is obtained. At block 206, the process of FIG. 2 is programmed to test whether sandboxed business logic is enabled for the record that was read at block 204. Enablement, at block 206, can be specified using a column attribute of the record, effectively signaling that other steps of FIG. 2 should execute to determine if a user function has been defined.

If the test of block 206 is NO or FALSE or the equivalent, then control transfers to block 208 at which the process of FIG. 2 is programmed to test whether the record read at block 204 is the last record in the dataset to be ingested. If the test of block 208 is YES or TRUE or the equivalent, then control transfer to block 210 at which the process of FIG. 2 is programmed to end operation or return control to a calling process.

If the test of block 206 is YES or TRUE or the equivalent, then control transfers to block 212 in which the process of FIG. 2 is programmed to test whether a user function is present for a destination table that is the target of the data ingestion process. Block 212 can be programmed to search user function storage 140 (FIG. 1) to identify, in a table of user functions or metadata relating to multiple stored user functions such as the user function 105, whether a specific user function has been defined for the destination table that was identified in the data ingestion request or API call.

If the test of block 212 is NO or FALSE or the equivalent, then the process of FIG. 2 is programmed to transfer control to block 208, which has been discussed above. If block 212 is YES or TRUE or the equivalent, then control transfers to block 214 at which the user function is executed over the record of the dataset that had been read at block 204. The user function may or may not result in returning a new, transformed record. At block 216, the process of FIG. 2 is programmed to test whether a new record is returned; if not, then the effect of the user function is to filter the current record, so a write operation to a destination table is not required, as shown in block 218. After block 218, control can transfer to block 208.

If the test of block 216 is YES or TRUE or the equivalent, then control transfers to block 220 at which the process of FIG. 2 is programmed to test whether the new record is valid. Validity checking at block 220 can comprise determining that a format of the new record is correct, for example. If the test of block 220 is YES or TRUE or the equivalent, then control transfers to block 222 at which the process of FIG. 2 is programmed to write the new record to persistent storage, for example, in the destination table that was specified in the API call to initiate data ingestion.

Optionally, the process of FIG. 2 is programmed to perform write error checking at block 224, block 226 and drop the new record if the new record did not write successfully to the persistent storage and/or destination table. During the execution of FIG. 2, records from JAVA objects are mapped to STARLARK objects, and the converse, in main memory.

Figure 3:
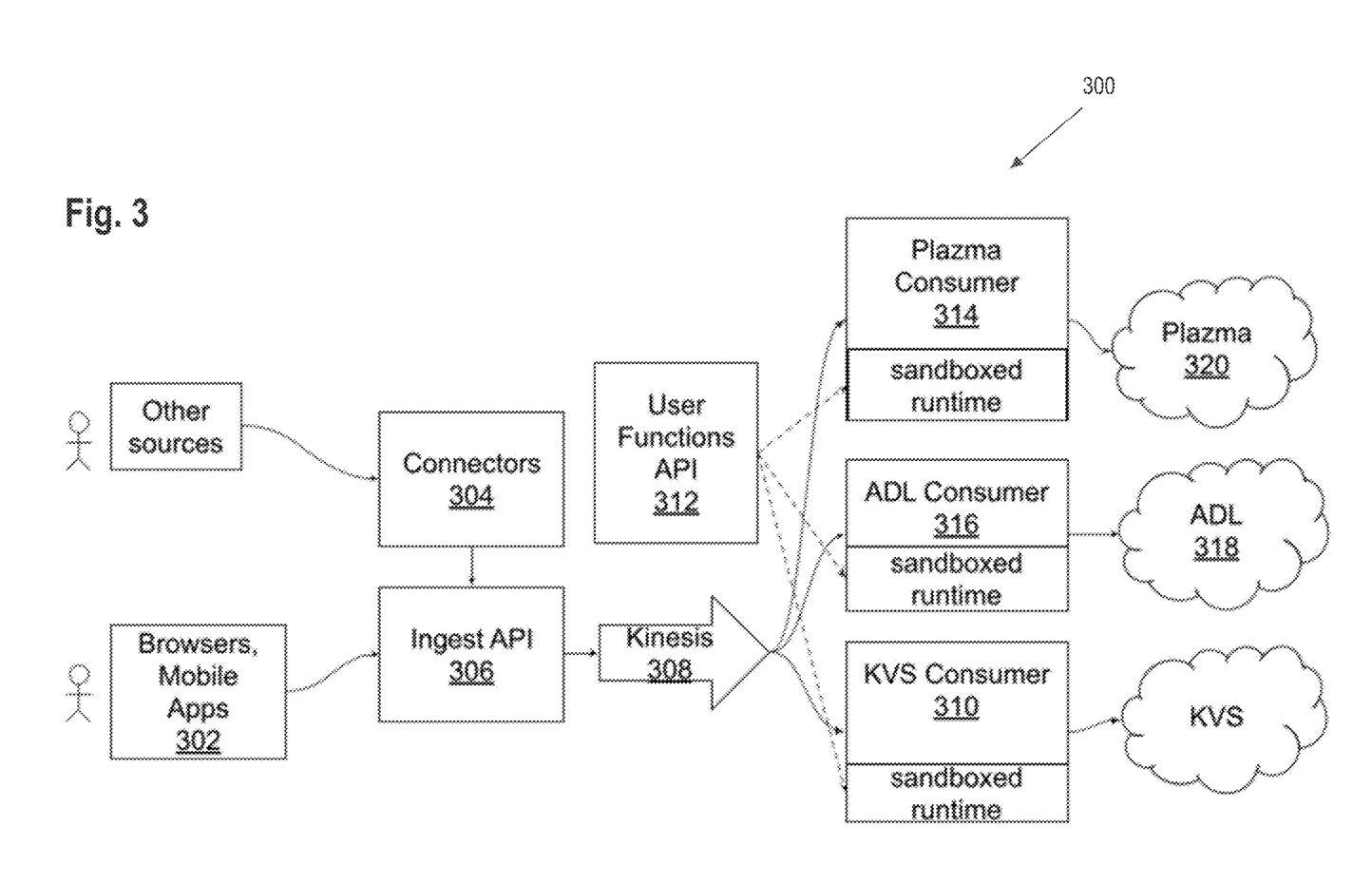
FIG. 3 illustrates an example data flow for data elements and functional elements of an embodiment in a customer data platform (CDP).

FIG. 3 illustrates an example data flow for data elements and functional elements of an embodiment in a customer data platform (CDP). In an example data flow 300, any number of browsers or mobile apps 302, or other sources, can post or write, to an ingress streaming connector 304 that is adapted to interoperate with the browsers or mobile apps, instructions to initiate a data ingestion operation. A connector 304 can be programmed to write a call to a streaming data ingestion API 306 to initiate an ingestion operation. As data records are ingested via operation of the API 306, records arrive at and are stored in an ingestion buffer 308. Function operators can be embedded either using a KVS consumer 310 or ADL consumer 316 and read using a function API 312, after which a function is executed against records in the buffer 308 and output records are written to a destination database 320, ADL 318, or provided to a workflow for downstream processing. The workflow can be programmed, for example, to batch write new records to the ADL using a compatible API 312.

Thus, in an embodiment, a pipeline or workflow of FIG. 3 can be structured to execute generally as follows. A data ingestion process initiates at a node, which can be any consumer service. Each node supports a table of functions, which can be stored in a file of a flat filesystem subject to access keys or other security controls. For each record processed in ingestion, inspect the table to determine if a function is present; if so, run the function on the data. Each function further specifies a destination table for new output records. An application programming interface supports operations to write a function, upload it, and download it for execution. Embodiments can implement checks or security controls based on account identifiers and keys for the filesystem.

Functions are stored centrally but loaded and cached in main memory of each node. Functions are compact. "User functions" and central store is "Functions API". Nodes call the FAPI to obtain functions. Functions stored per target table for the data. Run a data ingestion pipeline. Call the FAPI within the pipeline, The first time that a destination table is used, a node will call the API to obtain and cache the functions.

TABLE 1 illustrates logic configured to process each record on a stream:

TABLE 1

STREAM-BASED EXTENSION

```
def process_record(record)
    if record.get("td:c360:operation") != None:
        adl(record) # Send to Active Data Layer (ADL) with changes
        return # Do not send to main storage
    return record # Send to main storage
```

In some embodiments, the logic of TABLE 1 could be linked to a workflow stream-based operator as in TABLE 2.

TABLE 2

STREAM-BASED EXTENSION

```
+filter_stream_records:
    stream>: apply.stl # or apply.sql
    source: database/table
```

Logic like that of the examples in the tables can implement filter operations, conversion operations, masking operations, or enrichment operations on records of tables. Using embodiments, customers are not required to learn technical details of batch and stream contexts, facilitating easier reuse of logic in stream and batch applications. For example, assume that a particular customer has selected the following business requirements for a database table titled "web_store/cart_events" and representing online digital shopping cart activities of browsers or:

1. All shopping cart activity is useful for analysis except for events representing a change in a quantity of an item in the cart.
2. Purchase events should not be persistently stored.
3. Email addresses should be obfuscated in all storage.
4. Credit card details should not be persistently stored.
5. A "warehouse code" supplied by a front-end system should be replaced.
6. For certain operations, only fields for SKU, date, and type are useful.

These requirements can be implemented in the user function set forth in TABLE 3.

TABLE 3

SHOPPING CART EVENT RECORD PROCESSING

```
WAREHOUSE_CODES = {
    "virginia": "us01",
    "tokyo": "ap01",
    "eu": "eu01",
    "korea": "ap02"
}
def process_record(record):
    record["warehouse_code"]
    WAREHOUSE_CODES.get(record.pop("warehouse"), "us01"
    record["email"] = sha256(record["email"])
    record.pop("credit_card")
    if record["type"] != 'QUANTITY_CHANGE':
        kvs(record)
    adl({k: v for k, v in record if k in ["sku", "time", "type"]})
    if record["type"] == 'PURCHASE':
        return
    return record
```

In this example, returning "None" means that the record will not be persistently stored or provided in the default output. sha256( ) is a function that the STARLARK runtime implements as a built-in function, but a different implementation of SHA-256 digital signature or hash computation also could be used. adl( ) and kvs( ) can be programmed as extension functions in Java that extend STARLARK and are provided to the runtime; they can be programmed to send a duplicate of the input record to side outputs; for example, adl( ) sends output to Treasure Data's Active Data Layer (ADL) or a key-value store (KVS) for mass storage. A host application also can receive these outputs and process them as needed. The functions also apply validation checks, and discard events that are not valid for ADL or KVS operations. A function of this kind can be written and stored in a single storage location and managed by an API having calls to read and supply copies of functions, but execution is distributed; a plurality of different consumer applications load and run the user function for each destination table.

After execution of the example of TABLE 4, the records shown in TABLE 4 would be sent to a data ingestion API from a web server via a JAVASCRIPT SDK:

TABLE 4

SHOPPING CART EVENT OUTPUT RECORDS

{"time": 1642788769, "uid": 1, "type": "ADD", "warehouse": "tokyo", "email": "happy.customer@home.com", "sku": "5550001"}
{"time": 1642788799, "uid": 1, "type": "QUANTITY_CHANGE", "warehouse": "tokyo", "email": "happy.customer@home.com", "sku": "5550001", "old_value": 1, "new_value": 10}
{"time": 1642788969, "uid": 1, "type": "PURCHASE", "email": "happy.customer@home.com", "sku": ["5550001"], "credit_card": "4111111111111111"}

After ingestion, the data is written to a stream buffer. Other elements of FIG. 3, such as KVS Replicator, Ingest Aggregator, and Event Dispatcher can read the data in streaming fashion as consumers. For example, an Ingest Aggregator process can be programmed to ingest events by destination table and persistently store the events; it also can run functions on the events before aggregation. In an embodiment, a functions operator would translate the foregoing records to those shown in TABLE 5:

TABLE 5

AGGREGATED EVENT RECORDS

{"time": 1642788769, "uid": 1, "type": "ADD", "warehouse": "ap01", "email";
"ba4bcb21fc92d062d8ae31f8709517d035b0aea973662845a8923d10904c293f",
"sku": "5550001"}
{"time": 1642788799, "uid": 1, "type": "QUANTITY_CHANGE", "warehouse": "ap01", "email":
"ba4bcb21fc92d062d8ae31f8709517d035b0aea973662845a8923d10904c293f",
"sku": "5550001", "old_value": 1, "new_value"; 10}

The Event Dispatcher process can be programmed to route and filter incoming records for ADL as well as other consumers; the process can be implemented as a multi-tenant system that routes events to zero or more downstream single-tenant systems. A functions operator can be implemented to transform and filter records. If no function is configured for a dataset, then the function is not emitted to the ADL output or downstream. Thus, normal usage is to add a function for each ADL user/destination table that calls the adl(record) function. The Event Dispatcher also can use functions as a way to route events to destinations; for example, STARLARK code can be generated from a static routing configuration followed by computing a cluster/function destination field. In the following example, the user is an ADL user, and the function is for data processing; the events of TABLE 6 would be sent downstream:

TABLE 6

ADL EVENT EXAMPLE

{"time": 1642788769, "type": "ADD", "sku": "5550001"}
{"time": 1642788799, "type": "QUANTITY_CHANGE", "sku": "5550001"}
{"time": 1642788969, "type": "PURCHASE", "sku": "5550001"}

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
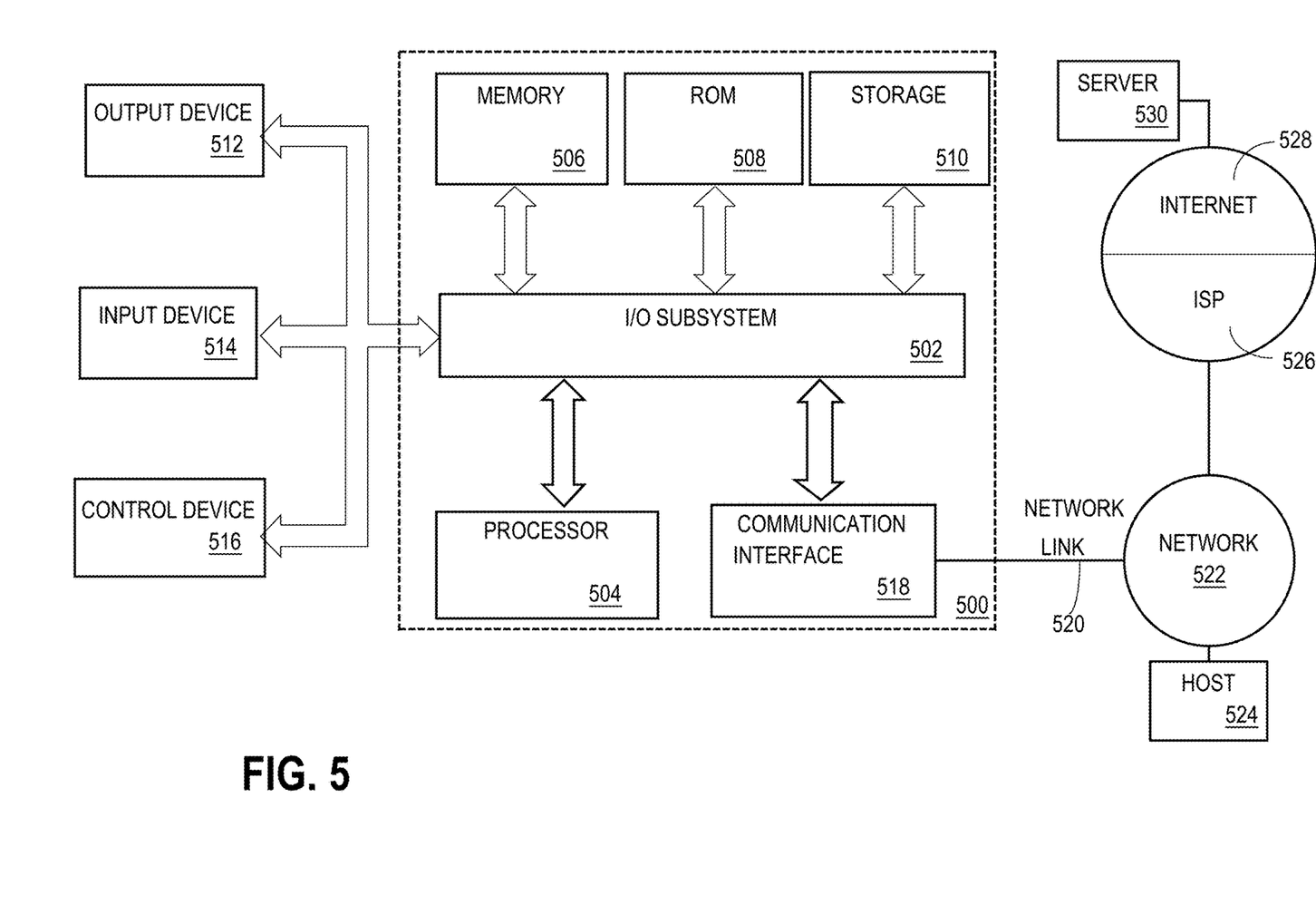
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   one or more central processing units (CPUs) that are communicatively coupled to a system clock, one or more network interfaces, and one or more database interfaces;
   digital electronic main memory that is communicatively coupled to the one or more CPUs and storing one or more sequences of stored program instructions which, when executed using the one or more CPUs, cause the one or more CPUs to execute a plurality of different consumer services of a SaaS-based data analytics platform, each of the consumer services hosting an instance of a sandboxed runtime for a hermetic and deterministic programming language;
   user function storage that is communicatively coupled to one of the database interfaces and storing a plurality of different user functions, each of the user functions having been programmed using the programming language, each of the user functions being stored in association with a reference to a destination table of a destination database;
   each of the consumer services being programmed to initiate a data ingestion process;
   load a copy of a user function from the user function storage to the sandboxed runtime that is associated with a particular consumer service from the plurality of different consumer services;
   using the sandboxed runtime local to the particular consumer service, execute the use r function over records directed to the destination table identified in the reference;
   filter the records or write new records resulting from the function to the destination table;
   each of the consumer services being programmed to:
   asynchronously, with respect to the execution of the particular consumer service, using a plurality of other consumer services among the plurality of different consumer services executing in the SaaS-based data analytics platform, initiate a plurality of other data ingestion processes for a plurality of datasets;
   as part of each data ingestion process among the plurality of other data ingestion processes, load a second copy of the user function using a second sandboxed runtime that is associated with each other consumer service;
   using the second sandboxed runtime that is local to each other consumer service, execute, over records of the datasets, the second copy of the user function directed to the destination table identified in the reference and filter the records or write new records resulting from the function to the destination table.

2. The computer system of claim 1, the SaaS-based data analytics platform comprising a customer data platform (CDP).

3. The computer system of claim 1, each of the consumer services being programmed to delete the user function from the particular consumer service or its sandboxed runtime after completing the data ingestion process.

4. The computer system of claim 1, each of the consumer services being programmed to:
   receive an identifier of a source dataset for ingestion;
   read successive records of the source dataset until all records have been read;
   for each record of the successive records that is read, determine whether a user function is present in the user function storage and has a reference to the destination table, and only when the user function is present and has the reference to the destination table, execute the user function over the each record.

5. The computer system of claim 4, each of the consumer services being programmed to write a new record resulting from executing the user function only when the new record is valid.

6. A computer-implemented method comprising:
   receiving a digitally defined user function that has been coded using a hermetic and deterministic human-readable programming language;
   storing the user function in a centralized database of user functions, in a table of user functions with a reference to a destination table;
   at a particular consumer service among a plurality of different consumer services executing in a SaaS-based data analytics platform, initiating a data ingestion process;
   loading a copy of the user function using a sandboxed runtime that is associated with the particular consumer service;
   using the sandboxed runtime local to the particular consumer service, executing the user function over records directed to the destination table identified in the reference and filtering the records or writing new records resulting from the function to the destination table;
   asynchronously, with respect to the execution of the particular consumer service, using a plurality of other consumer services among the plurality of different consumer services executing in the SaaS-based data analytics platform, initiating a plurality of other data ingestion processes for a plurality of datasets;
   as part of each data ingestion process among the plurality of other data ingestion processes, loading a second copy of the user function using a second sandboxed runtime that is associated with each other consumer service;
   using the second sandboxed runtime that is local to each other consumer service, executing, over records of the datasets, the second copy of the user function directed to the destination table identified in the reference and filtering the records or writing new records resulting from the function to the destination table.

7. The method of claim 6, the SaaS-based data analytics platform comprising a customer data platform (CDP).

8. The method of claim 6, further comprising deleting the user function from the particular consumer service or its sandboxed runtime after completing the data ingestion process.

9. The method of claim 6, the particular consumer service being programmed to:
   receive an identifier of a source dataset for ingestion;
   read successive records of the source dataset until all records have been read;
   for each record of the successive records that is read, determine whether a user function is present in the centralized database of user functions and has a reference to the destination table, and only when the user function is present and has the reference to the destination table, execute the user function over each record.

10. The method of claim 9, each of the consumer services being programmed to write a new record resulting from executing the user function only when the new record is valid.

11. The method of claim 6, further comprising, after completing the data ingestion process, deleting the user function from the particular consumer service or its sandboxed runtime.

* * * * *